3,000,985
PREPARATION OF DIARYLALKANES
Louis Schmerling, Riverside, Ill., assignor, by mesne assignments, to Universal Oil Products Company, Des Plaines, Ill., a corporation of Delaware
No Drawing. Filed June 24, 1958, Ser. No. 744,045
16 Claims. (Cl. 260—668)

This application is a continuation-in-part of my co-pending application Serial No. 594,082 filed June 27, 1956, now abandoned. The invention relates to a process for the preparation of diarylalkanes and more particularly to a method for the preparation of bis-(p-xylyl)methane.

It is known that a p-dialkyl aromatic compound in which at least one of the alkyl groups contains more than one carbon atom and is attached to the aromatic nucleus by a secondary or tertiary carbon atom (i.e., the alkyl group is a primary or secondary alkyl group) will undergo a hydrogen transfer reaction when treated with an alkylating agent in the presence of an acidic catalyst. However, it has been reported that when both of the alkyl groups contain only one carbon atom, as in p-xylene, such a reaction does not occur. I have now discovered that p-xylene will undergo a hydrogen transfer reaction when treated with certain types of alkylating agents in the presence of certain catalysts, the product being not the expected 2-(p-methylbenzyl)-p-xylene but bis-(p-xylyl)methane instead.

Therefore, it is an object of this invention to provide a process for the reaction of p-xylene with an alkylating agent to form bis-(p-xylyl)methane.

One embodiment of this invention is found in a process which comprises reacting p-xylene with an alkylating agent selected from the group consisting of t-alkyl halides and cycloalkyl halides in the presence of a catalyst selected from the group consisting of aluminum chloride, aluminum bromide, boron fluoride and zirconium chloride, and recovering the resultant reaction products.

A specific embodiment of the invention is found in a process for the preparation of bis-(p-xylyl)methane which comprises reacting p-xylene with t-penyl chloride in the presence of aluminum chloride at a temperature in the range of from about —20° to about 150° C. and at a pressure in the range of from about atmospheric to about 50 atmospheres, and recovering the resultant bis-(p-xylyl)methane.

Other objects and embodiments referring to alternative t-alkyl halides and cycloalkyl halides will be found in the following further detailed description of the invention.

As hereinbefore stated it has now been discovered that p-xylene will undergo a hydrogen transfer reaction when treated with a t-alkyl halide or cycloalkyl halide in the presence of certain acid-acting catalysts to form bis-(p-xylyl)methane as well as an alkylated p-xylene. The products of the present invention may be sulfonated and the resulting derivatives as used as wetting agents. It is also possible to nitrate and reduce the products of this invention to form mono- and polyamines, these mono- and polyamines being useful as oxidation inhibitors. In addition, the amines thus formed may, in turn, also be converted to phenols by diazotization and hydrolysis to form compounds which are useful as oxidation inhibitors. The alkylating agents comprising t-alkyl halides and cycloalkyl halides which may be used in this process include in particular the chlorides and bromides such as t-butyl chloride, t-butyl bromide, t-pentyl chloride, t-pentyl bromide, t-hexyl chloride, t-hexyl bromide, etc.; cyclopentyl chloride, cyclopentyl bromide, cyclohexyl chloride, cyclohexyl bromide, 1-methyl-1-chlorocyclopentane, 1-methyl-1-bromocyclopentane, 1-methyl-1-chlorocyclohexane, 1-methyl-1-bromocyclohexane, etc.

It is to be understood that the aforementioned alkylating agents are only representatives of the class of compounds which may be used, and that the present invention is not necessarily limited thereto. The reaction of p-xylene with a t-alkyl halide or cycloalkyl halide to yield the desired bis-(p-xylyl)methane involves several reactions among which are hydrogen transfer, alkylation and transar-alkylation of p-xylene and takes place in the presence of certain active Friedel-Crafts type catalysts, said catalysts including aluminum chloride, aluminum bromide, boron fluoride and zirconium chloride. The reaction is effected at temperatures ranging from about —20° to about 150° C. and preferably at a temperature in the range of from about 0° to about 100° C. In addition, the reaction is effected at varying pressures, the pressure being sufficient to maintain at least a substantial portion of the reactants in the liquid phase and may range from about atmospheric to about 50 atmospheres or more.

For example, when p-xylene is treated with t-pentyl chloride in the presence of an aluminum chloride catalyst the reaction will proceed according to the following equation:

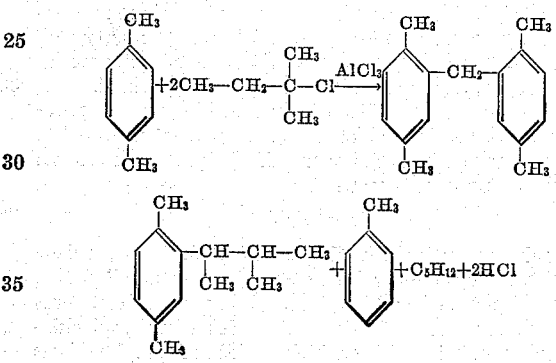

The reaction may be carried out, if so desired, in the presence of an organic solvent. However, the particular solvent used must be inert and should not enter into the reaction nor act as a hydrogen donor. Inert solvents which may be used include normal paraffins such as n-pentane, n-hexane, n-heptane, etc., cyclopentane, cyclohexane, etc.

The process of this invention may be effected in any suitable manner and may comprise either a batch or a continuous type operation. For example, when a batch type operation is used a quantity of the p-xylene and catalyst are placed in an appropriate condensation apparatus and the t-alkyl halide or cycloalkyl halide dissolved in an additional amount of p-xylene is gradually added thereto at the desired temperature. The reaction is often maintained in the range of from about 0° C. to about 25° C. during the initial portion of the reaction, but may be raised to a higher temperature and maintained thereat during the remainder of the residence time. At the end of the predetermined time the reaction product is separated from any unreacted starting material, washed with water and dilute alkali, dried and subjected to fractional distillation under reduced pressure to recover the desired product.

The reaction of the p-xylene with a t-alkyl halide or cycloalkyl halide of the type hereinbefore set forth may also be effected in a continuous reaction. In this type of reaction p-xylene is continuously charged to a reactor which is maintained at the proper operating conditions of temperature and pressure, said reactor comprising an unpacked vessel or coil or a vessel or coil which may be lined with an adsorbent material such as alumina, dehydrated bauxite, fire brick and the like. The t-alkyl halide or cycloalkyl halide is also continuously charged to the reactor through a separate line or if so desired, the halide and p-xylene may be admixed prior to introduction into said reactor and charged thereto in a single line. The reactants are charged to said reactor at a liquid hourly space velocity ranging from about 0.1 to about 10 (the liquid hourly space velocity being defined as the volume of reactants per volume of catalyst per hour).

A particularly suitable type of operation comprises a fixed bed type in which the catalyst is disposed as a fixed bed in the reactor and the reactants are passed therethrough either upwardly or downwardly. The reaction product is continuously withdrawn from the reactor, separated from the reactor effluent and purified by conventional means hereinbefore set forth while the unreacted starting materials may be recycled to form a portion of the feed stock. Other continuous types of operation which may be used in this process include the fluidized type of operation in which the reactants comprising the p-xylene and the t-alkyl halide or cycloalkyl halide and the catalyst are maintained in a state of turbulence under hindered settling conditions in the reaction zone, the compact moving bed type of operation in which the catalyst and the reactants are passed either concurrently or countercurrently to each other, and the slurry type process in which the catalyst is carried into the reaction zone as a slurry in the p-xylene. It is to be understood that in each of the latter mentioned types of continuous processes the unreacted starting materials may be separated out and recycled for use as a portion of the feed material while the desired product is withdrawn and purified.

The following examples are given to illustrate the process of this invention, which, however, are not intended to limit the generally broad scope of the present invention in strict accordance therewith.

Example I

A mixture comprising 424 g. (4.0 moles) of p-xylene and 5 g. of aluminum chloride was placed in an alkylating flask and cooled in an ice bath. While the mixture was continuously stirred, 106 g. (1.0 mole) of t-pentyl chloride dissolved in 106 g. (1.0 mole) of p-xylene was gradually added thereto. During this time the temperature of the flask dropped from 11° C. (at which temperature the p-xylene was partially crystalline) to 2° C. during the one hour which was required for the addition of the t-pentyl chloride dissolved in p-xylene. After completion of the aforementioned addition the reaction mixture was stirred at approximately 5° C. for one-half hour, after which the temperature was permitted to rise to room temperature (24° C.) during a period of about two hours. The product in the reaction flask consisted of 570 g. of a clear red upper layer and 29 g. of an opaque red-amber lower layer. The upper layer was separated from the lower layer, washed with water, dilute alkali, dried and subjected to fractional distillation under reduced pressure. A cut boiling at 125–126° C. at 1 mm. pressure (about 327–329° C. at 760 mm. pressure) was separated out. This cut comprising bis-(p-xylyl)methane crystallized upon standing and had a melting point of 61–62° C. The cut was analyzed and the results are set forth below.

Calculated for $C_{16}H_{18}$: C, 91.37; H, 8.63. Found: C, 91.31; H, 9.16.

There was also obtained a liquid product boiling at 65° C. at 1 mm. pressure (about 225° C. at 760 mm. pressure) which consisted of 2-(1,2-dimethylpropyl)-p-xylene.

Example II p-Xylene (265 g., 2.5 moles) and 5 g. of aluminum chloride were placed in an alkylation flask and cooled by means of an ice bath. A solution of 46 g. of t-butyl chloride dissolved in 106 g. of p-xylene was slowly added during 1.5 hours to this mixture at about 1–5° C. while said mixture was being continuously stirred. At the end of this time the temperature of the flask was allowed to rise to about 22° C. during about 1.5 hours after which the upper layer of the reaction mixture was separated from the lower catalyst layer, washed with water, dilute alkali and subjected to fractional distillation under reduced pressure. Bis-(p-xylyl)methane (40 g.) was separated from the reaction mixture. There was obtained about 6 g. each of butyltoluene and toluene. Isobutane was also formed, but was not collected.

Example III t-Butyl chloride (0.32 mole) was added gradually during 25 minutes to a stirred mixture of 1.25 moles of p-xylene and 5 g. of zirconium chloride in an alkylation flask at room temperature (24° C.). Stirring was continued for an additional hour at this temperature after which it was slowly raised to 80° C. during about 3.5 hours. The mixture was allowed to cool to room temperature, after which the upper layer was separated from the lower catalyst layer, washed with water, dilute alkali, dried and subjected to fractional distillation. There was obtained 12 g. of bis-(p-xylyl)methane together with 9 g. of di-t-butyltoluene. There was also isolated 4 g. of isobutane, formed by hydrogen-chlorine exchange of the t-butyl chloride and the p-xylene.

Example IV

A mixture of p-xylene and boron fluoride is placed in an alkylation flask and cooled by means of an ice bath. A solution of cyclohexyl bromide dissolved in p-xylene is gradually added thereto during a period of approximately 30 minutes while continually stirring the reaction mixture. Stirring is continued for an additional hour during which the mixture is allowed to warm to room temperature. The upper layer is separated from the lower catalyst layer, washed with water, dilute alkali, dried and subjected to fractional distillation under reduced pressure, the cuts comprising bis-(p-xylyl)methane, cyclohexyltoluene and toluene being separated from the reaction mixture.

Example V

A mixture of p-xylene and boron fluoride is placed in an alkylation flask and cooled by means of an ice bath. A solution of cyclopentyl chloride dissolved in p-xylene is gradually added thereto during a period of approximately 30 minutes while continually stirring the reaction mixture. Stirring is continued for an additional hour during which the mixture is allowed to warm to room temperature. The upper layer is separated from the lower catalyst layer, washed with water, dilute alkali, dried and subjected to fractional distillation under reduced pressure, the cuts comprising bis-(p-xylyl)methane, cyclopentyltoluene and toluene being separated from the reaction mixture.

I claim as my invention:

1. A process which comprises reacting p-xylene with an alkylating agent selected from the group consisting of t-alkyl mono-halides and cycloalkyl mono-halides in the presence of a catalyst selected from the group consisting of aluminum chloride, aluminum bromide, boron fluoride and zirconium chloride at a temperature in the range of from about −20° to about 150° C. and at a pressure in the range of from about atmospheric to about 50 atmospheres, and recovering the resultant reaction products.

2. A process which comprises reacting p-xylene with an alkylating agent comprising a t-alkyl mono-halide in the presence of a catalyst selected from the group consisting of aluminum chloride, aluminum bromide, boron fluoride and zirconium chloride at a temperature in the range of from about −20° to about 150° C. and at a pressure in the range of from about atmospheric to about 50 atmospheres, and recovering the resultant reaction products.

3. A process which comprises reacting p-xylene with an alkylating agent comprising a cycloalkyl mono-halide in the presence of a catalyst selected from the group consisting of aluminum chloride, aluminum bromide, boron fluoride and zirconium chloride at a temperature in range of from about —20° to about 150° C. and at a pressure in the range of from about atmospheric to about 50 atmospheres, and recovering the resultant reaction products.

4. A process which comprises reacting p-xylene with an alkylating agent selected from the group consisting of t-alkyl chlorides, t-alkyl bromides, cyclo-alkyl chlorides and cycloalkyl bromides containing only one halogen atom per molecule in the presence of a catalyst selected from the group consisting of aluminum chloride, aluminum bromide, boron fluoride and zirconium chloride at a temperature in the range of from about —20° to about 150° C. and at a pressure in the range of from about atmospheric to about 50 atmospheres, and recovering the resultant reaction products.

5. A process which comprises reacting p-xylene with an alkylating agent selected from the group consisting of t-alkyl mono-halides and cycloalkyl mono-halides in the presence of aluminum chloride at a temperature in the range of from about —20° to about 150° C. and at a pressure in the range of from about atmospheric to about 50 atmospheres, and recovering the resultant reaction products.

6. A process which comprises reacting p-xylene with an alkylating agent selected from the group consisting of t-alkyl mono-halides and cycloalkyl mono-halides in the presence of aluminum bromide at a temperature in the range of from about —20° to about 150° C. and at a pressure in the range of from about atmospheric to about 50 atmospheres, and recovering the resultant reaction products.

7. A process which comprises reacting p-xylene with an alkylating agent selected from the group consisting of t-alkyl mono-halides and cycloalkyl mono-halides in the presence of boron fluoride at a temperature in the range of from about —20° to about 150° C. and at a pressure in the range of from about atmospheric to about 50 atmospheres, and recovering the resultant reaction products.

8. A process which comprises reacting p-xylene with an alkylating agent selected from the group consisting of t-alkyl mono-halides and cycloalkyl mono-halides in the presence of zirconium chloride at a temperature in the range of from about —20° to about 150° C. and at a pressure in the range of from about atmospheric to about 50 atmospheres, and recovering the resultant reaction products.

9. A process for the preparation of bis-(p-xylyl)methane which comprises reacting p-xylene with t-pentyl chloride in the presence of aluminum chloride at a temperature in the range of from about —20° to about 150° C. and at a pressure in the range of from about atmospheric to about 50 atmospheres, and recovering the resultant bis-(p-xylyl)methane.

10. A process for the preparation of bis-(p-xylyl)methane which comprises reacting p-xylene with t-butyl bromide in the presence of aluminum chloride at a temperature in the range of from about —20° to about 150° C. and at a pressure in the range of from about atmospheric to about 50 atmospheres, and recovering the resultant bis-(p-xylyl)methane.

11. A process for the preparation of bis-(p-xylyl)methane which comprises reacting p-xylene with cyclohexyl bromide in the presence of aluminum chloride at a temperature in the range of from about —20° to about 150° C. and at a pressure in the range of from about atmospheric to about 50 atmospheres, and recovering the resultant bis-(p-xylyl)methane.

12. A process for the preparation of bis-(p-xylyl)methane which comprises reacting p-xylene with cyclopentyl chloride in the presence of aluminum chloride at a temperature in the range of from about —20° to about 150° C. and at a pressure in the range of from about atmospheric to about 50 atmospheres, and recovering the resultant bis-(p-xylyl)methane.

13. A process for the preparation of bis-(p-xylyl)methane which comprises reacting p-xylene with t-pentyl chloride in the presence of aluminum chloride at a temperature in the range of from about 0° to about 100° C. and at a pressure in the range of from about atmospheric to about 50 atmospheres, and recovering the resultant bis-(p-xylyl)methane.

14. A process for the preparation of bis-(p-xylyl)methane which comprises reacting p-xylene with t-butyl bromide in the presence of aluminum chloride at a temperature in the range of from about 0° to about 100° C. and at a pressure in the range of from about atmospheric to about 50 atmospheres, and recovering the resultant bis-(p-xylyl)methane.

15. A process for the preparation of bis-(p-xylyl)methane which comprises reacting p-xylene with cyclohexyl bromide in the presence of aluminum chloride at a temperature in the range of from about 0° to about 100° C. and at a pressure in the range of from about atmospheric to about 50 atmospheres, and recovering the resultant bis-(p-xylyl)methane.

16. A process for the preparation of bis-(p-xylyl)methane which comprises reacting p-xylene with cyclopentyl chloride in the presence of aluminum chloride at a temperature in the range of from about 0° to about 100° C. and at a pressure in the range of from about atmospheric to about 50 atmospheres, and recovering the resultant bis-(p-xylyl)methane.

References Cited in the file of this patent

UNITED STATES PATENTS

| | | |
|---|---|---|
| 2,673,224 | Kennedy et al. | Mar. 23, 1954 |
| 2,860,169 | Schlatter | Nov. 11, 1958 |
| 2,882,325 | Luvisi | Apr. 14, 1959 |

OTHER REFERENCES

Huston et al.: Jour. of Am. Chem. Society, vol. 37, 1915, pp 2394–2399.